(12) United States Patent
Prior et al.

(10) Patent No.: US 8,779,630 B2
(45) Date of Patent: Jul. 15, 2014

(54) POWER GENERATION SYSTEM AND INVERTER FOR FEEDING POWER INTO A THREE-PHASE GRID

(75) Inventors: Oliver Prior, Marsberg (DE); Thomas Schroeder, Kassel (DE); Henrik Wolf, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 592 days.

(21) Appl. No.: 12/719,662

(22) Filed: Mar. 8, 2010

(65) Prior Publication Data
US 2010/0226160 A1 Sep. 9, 2010

(30) Foreign Application Priority Data
Mar. 9, 2009 (EP) ..................................... 09003353

(51) Int. Cl.
*H01H 19/64* (2006.01)
(52) U.S. Cl.
USPC ......................................................... 307/113
(58) Field of Classification Search
USPC .............................. 307/85, 113; 361/160, 166
See application file for complete search history.

(56) References Cited

U.S. PATENT DOCUMENTS

| | | | |
|---|---|---|---|
| 6,239,997 B1 * | 5/2001 | Deng ................................ | 363/95 |
| 6,624,989 B2 * | 9/2003 | Brooks, Jr. ........................ | 361/6 |
| 2008/0067877 A1 * | 3/2008 | Nitsche ......................... | 307/328 |
| 2008/0203820 A1 | 8/2008 | Kramer et al. | |
| 2010/0295383 A1 * | 11/2010 | Cummings ................... | 307/151 |

FOREIGN PATENT DOCUMENTS

| | | |
|---|---|---|
| DE | 10 2005 014 122 A1 | 9/2006 |
| DE | 10 2006 030 751 A1 | 12/2007 |
| EP | 1 538 651 A2 | 6/2005 |
| EP | 1 965 483 A1 | 9/2008 |
| JP | 58-86822 | 5/1983 |
| JP | 6-52770 | 2/1994 |
| JP | 8-130883 | 5/1996 |
| JP | 11-069661 | 3/1999 |
| JP | 2000-250468 | 9/2000 |
| JP | 2000-354322 | 12/2000 |
| JP | 2003-116222 A | 4/2003 |
| JP | 2004-23918 | 1/2004 |
| JP | 2006-34000 | 2/2006 |
| JP | 5012102 | 6/2012 |

OTHER PUBLICATIONS

European Search Report dated Sep. 24, 2009 including partial English translation (Four (4) pages).
Japanese Office Action dated Feb. 18, 2014.

* cited by examiner

*Primary Examiner* — Daniel Cavallari
(74) *Attorney, Agent, or Firm* — Crowell & Moring LLP

(57) ABSTRACT

A power generation system for feeding electrical power from a generation unit into a three-phase grid via three AC terminals is disclosed. The system includes a relay arrangement for disconnecting the system from the grid having at least three relays. Each of the three relays includes a control coil and two switching contacts operated by the corresponding control coil. Each of the AC terminals is connectable to the grid via a first and a second switching contact, each of which is assigned to a different one of the relays. Further disclosed are a relay arrangement and an inverter with a relay arrangement.

23 Claims, 3 Drawing Sheets

POWER GENERATION SYSTEM AND INVERTER FOR FEEDING POWER INTO A THREE-PHASE GRID

CROSS REFERENCE TO RELATED APPLICATIONS

This application claims the priority of European patent application EP 09003353.1, filed on Mar. 9, 2009, the disclosure of which is incorporated herein by reference in its entirety.

BACKGROUND AND SUMMARY OF THE INVENTION

The invention relates to a power generation system with a relay arrangement for disconnecting the system from a three-phase grid. The invention also relates to an inverter for providing power to a three-phase grid, and a corresponding relay arrangement.

Power generation systems are used to provide electrical power to a grid. Their importance is increasing as natural resources to run large power plants are limited and becoming more expensive. One example of such a system is an inverter, which may be used to convert a direct current (DC) into an alternating current (AC), and typically includes a semiconductor bridge circuit that functions as a DC-AC converter.

The direct current may come from any DC source such as a battery, for example. The DC source may be a photovoltaic generator that is used to feed energy into a grid.

Photovoltaic inverters intended for installation on relatively small surfaces should be as compact, easy to handle, and as lightweight as possible to minimize the need for tools during installation. Such inverters should have weight and dimensions that allow one to two people to transport and install them largely unaided.

The necessary electronic components, semiconductors, filter chokes, capacitors, and similar elements are contained within the housing. An increase in the permissible output power of the device may result in an increase in the dimensions of the individual components. Therefore, a device or its housing must be as tightly equipped as possible if it is to be compact.

To receive approval for grid parallel feeding, the applicable standards and regulations (e.g. DIN V VDE V 0126-1-1) require that power generation systems are to be connected to the grid via an automatic switching circuit. The main purpose of this device is to prevent unintentional feeding into a sub-grid or stand-alone grid, often referred to as anti-islanding, and hence serves a protective function.

To eliminate the need for an additional housing or additional installation aids, the switching circuit may be integrated into the existing inverter housing. However, this increases the size of the housing.

The aforementioned standard also requires that this switching circuit is able to interrupt the feed in process for each active conductor via two serially connected and independently activated switches. The disconnection is to be established in such a way as to ensure the safety function, even in the event of a single error.

A common practice for meeting this requirement is to use a single-pole relay with sufficient switching capacity for medium power ranges up to 10 kW or higher. This relay usually includes an independent controller and corresponding monitoring device.

Three-pole relays or contactors are only available for higher power ranges and require significantly more installation space than printed circuit board (PCB) relays. Furthermore, their assembly is labor-intensive, error-prone, and unsuitable for large-batch production. A standards-compliant solution would therefore require the use of six single-pole relays, which is not only costly but also takes up installation space.

According to an aspect of the invention, a power generation system for feeding electrical power from a generation unit into a three-phase grid via three AC terminals is provided. The system includes a relay arrangement for disconnecting the inverter from the grid. The relay arrangement includes at least three relays, each of which is equipped with a control coil and two switching contacts operated by the control coil. Each AC terminal of the system is connectable to the grid via a first and a second switching contact, each of which is assigned to a different one of the relays.

The system may include an inverter, such as a photovoltaic inverter, in particular a transformerless photovoltaic inverter. The relay arrangement may be integrated into the system's housing, and may be arranged on a circuit board of the system, thus leading to a compact system design.

In a further aspect of the invention, an inverter for converting a DC power into an AC power provided to a three-phase grid via three AC terminals is provided. The inverter includes a relay arrangement for disconnecting the inverter from the grid. The relay arrangement includes at least three relays, each of which includes a control coil and two switching contacts operated by the corresponding control coil. Each AC terminal is connectable to the grid via a first and a second switching contact, each of which is assigned to a different one of the relays.

In yet a further aspect, a relay arrangement for disconnecting an inverter from a three-phase grid with three active conductors is provided. The relay arrangement includes at least three relays, each of which includes a control coil and two switching contacts operated by the corresponding control coil. Each switching contact is connected to another switching contact that is assigned to a different one of the relays.

Other objects, advantages, and novel features of the present invention will become apparent from the following detailed description of the invention when considered in conjunction with the accompanying drawings.

The drawings below provide a more detailed description of the invention, and are intended to illustrate specific embodiments. They are not intended to limit the scope of the invention.

DETAILED DESCRIPTION OF THE DRAWINGS

Figure 1:
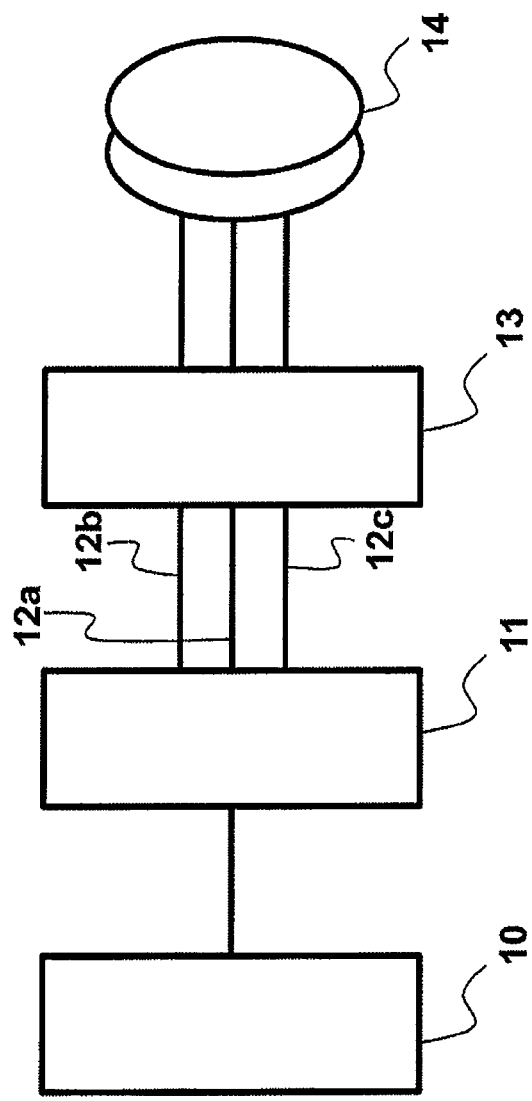
FIG. 1 is a schematic diagram of a power generation system according to an exemplary embodiment of the invention.
Figure 2:
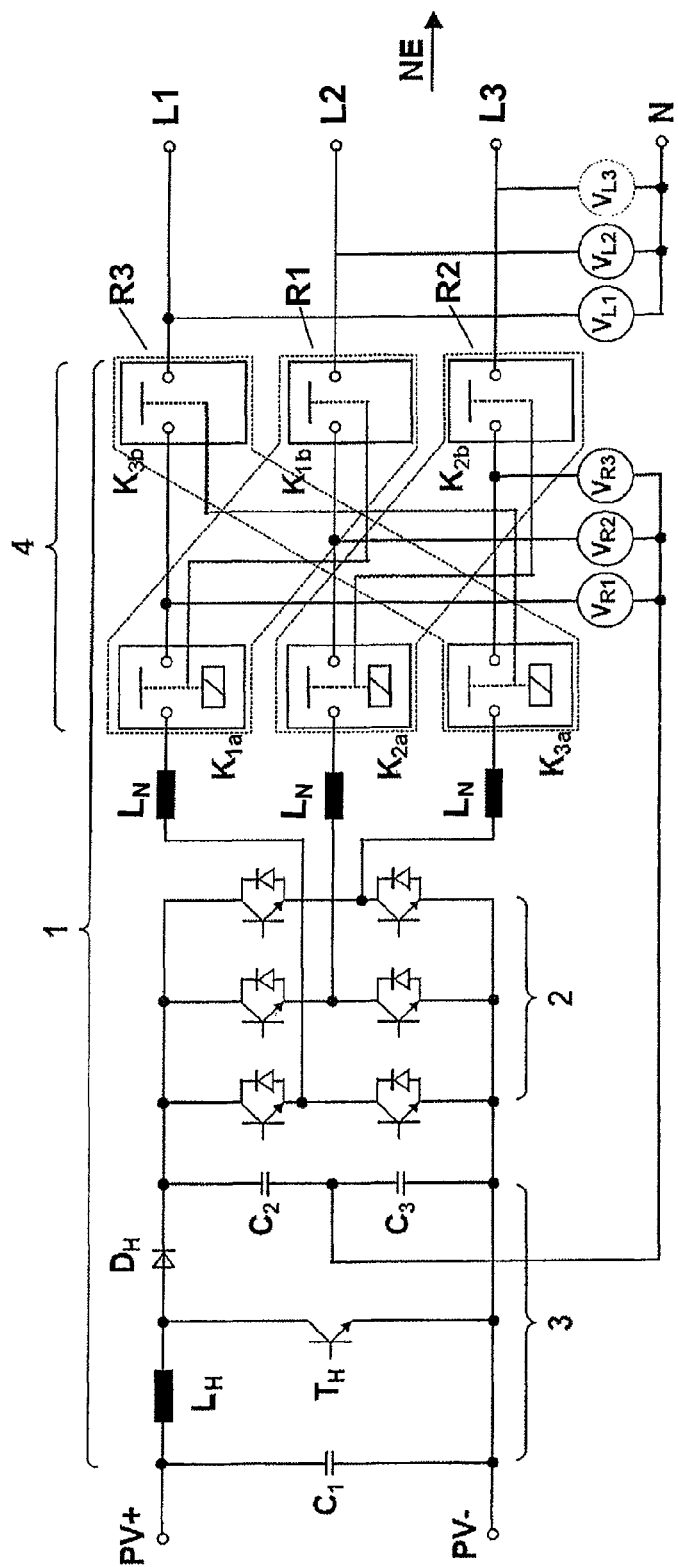
FIG. 2 shows an inverter with a relay arrangement for disconnecting the inverter from a grid according to an exemplary embodiment of the invention.
Figure 3:
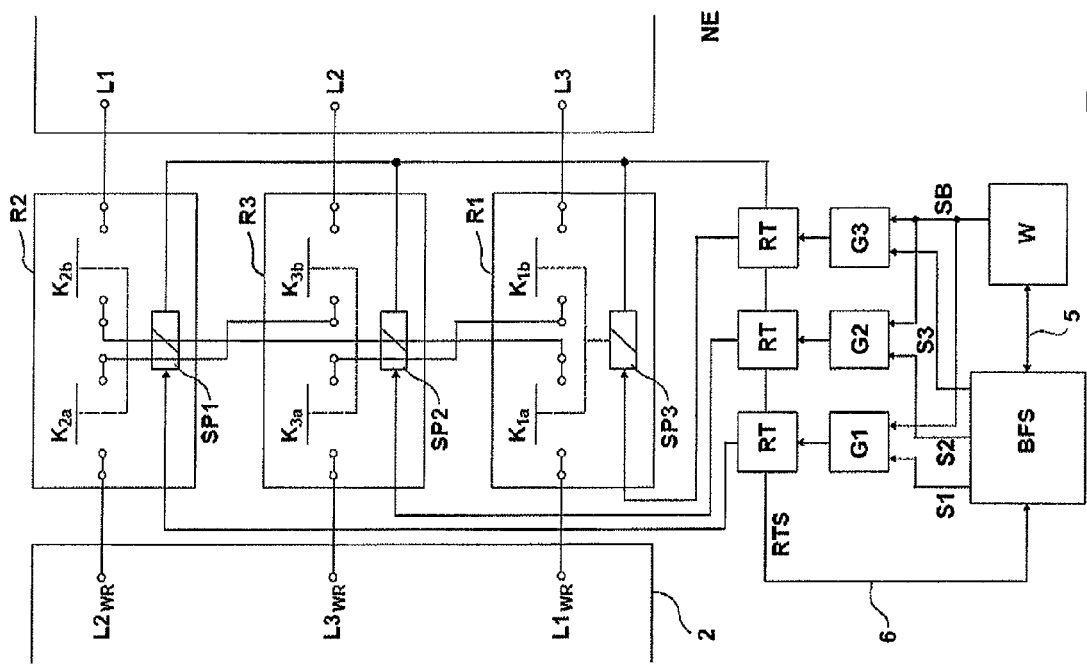
FIG. 3 shows a safety concept for a three-phase grid relay arrangement according to an exemplary embodiment of the invention.

A power generation system according to an exemplary embodiment of the invention is schematically depicted in FIG. 1. The power generation system includes a generation unit 10, which generates electrical energy, and provides the energy to a conversion unit 11. The generation unit 10 may be a photovoltaic generator, a fuel cell, a wind generator, or any other generation system. The conversion unit 11 receives the energy from the generation unit 10, and converts the energy into a form that can be fed into a grid 14. If the grid 14 is a three-phase AC grid as illustrated, the conversion unit includes three AC terminals 12a, 12b, 12c. As some standards applicable to power generation systems require that the system automatically disconnects from the grid 14 in case of a failure of the grid 14 or the system, e.g. in an islanding situation, a relay arrangement 13 is used to connect the AC terminals 12a, 12b, 12c to the grid 14. More details of the relay arrangement 13 are illustrated in FIGS. 2 and 3 with respect to an inverter, which may form the conversion unit 11. The relay arrangement 13 provides the above-mentioned functionality in terms of automatic connection and disconnection to meet the standards for feeding power to a public grid. In the following, an inverter connected to a grid via a relay arrangement is used as an example of a component of a power generation system. However, the details given below may be used accordingly in a power generation system in general.

FIG. 2 shows an inverter 1, which may form part of a power generation system, with conversion circuitry for converting a DC voltage provided between generator terminals PV+ and PV−, such as a DC voltage provided by photovoltaic generators, into a three-phase AC voltage with a grid frequency. The inverter 1 may include a full bridge circuit 2 with six semiconductor switches and parallel free-wheeling diodes which together form a DC/AC converter. Between the generator terminals PV+ and PV− and the full bridge circuit 2 there is shown a buffer capacitor $C_1$, as well as an optional step-up converter 3 including a choke $L_H$, a switch $T_H$, and a diode $D_H$. Two DC link capacitors $C_2$ and $C_3$ are arranged in series between the step-up converter 3 and the full bridge circuit 2. The link capacitors $C_2$ and $C_3$ may be of identical capacitance. The connection point of capacitors $C_2$ and $C_3$ forms a voltage tap for voltages $V_{R1}$, $V_{R2}$, $V_{R3}$, which are measured in order to monitor the functionality of a relay arrangement 4 arranged between the full bridge circuit 2 and a grid NE represented by active conductors L1, L2, L3. In this case, the connection point is used to define a reference voltage point. Between the relay arrangement 4 and the full bridge circuit 2 there may be a filter including three filter chokes $L_N$. The relay arrangement 4 serves to disconnect the inverter 1 from the active conductors L1, L2, L3 of the grid NE under predefined conditions. The grid NE is equipped with a neutral conductor N, and the conductor voltages $V_{L1}$, $V_{L2}$, $V_{L3}$ of the active conductors L1, L2, L3 are measured with reference to neutral conductor N as an additional means of function monitoring of the relay arrangement 4.

As can be seen in FIG. 2, each active conductor L1, L2, L3 is routed to one of the AC terminals via a pair of switching contacts. For example, the active conductor L1 is routed over switching contacts $K_{1a}$ and $K_{3b}$. The switching contacts of each pair are assigned to two different relays R1, R2, R3.

A specific relay arrangement 4 with an alternative routing scheme of active conductors L1, L2, L3 is shown in FIG. 3. The relay arrangement 4 in this embodiment includes three two-pole relays R1, R2, R3. Each relay R1, R2, R3 has a corresponding control coil SP1, SP2, SP3 and two of the switching contacts $K_{1a}$, $K_{1b}$; $K_{2a}$, $K_{2b}$; $K_{3a}$, $K_{3b}$ are assigned to each control coil SP1, SP2, SP3 and relays R1, R2, R3, respectively. Relays R1, R2, R3 may include normally open (NO) switching contacts.

The relays R1, R2, R3 may be integrated into a housing of the inverter (not shown). In this case, the relays R1, R2, R3 may be arranged on a circuit board of the inverter, for example as PCB relays, so as to provide a cheap, lightweight, and compact inverter design, and allow for space savings, for example as compared to the use of six single-pole relays. The relays R1, R2, R3 may even be integrated into the housing with minimal or no changes to the dimensions of the inverter. Especially in, but not limited to the case of a transformerless inverter, extremely compact dimensions of the inverter housing may be achieved, which in turn allows for a flexible integration of the inverter into a building structure.

One relay contact of a corresponding relay is serially connected to a relay contact of one of the other two relays. For instance, as shown in FIG. 3, switching contact $K_{1a}$ of relay R1 is connected to switching contact $K_{2b}$ of relay R2, so that active conductor L1 is connected to terminal $L1_{WR}$ of the inverter 1 via two switching contacts $K_{1a}$ and $K_{2b}$ of two separate relays R1, R2. The other inverter terminals are also routed over two switching contacts of different relays, resulting in a cyclic permutation of the relays operating the corresponding two switching contacts, as shown in FIG. 3. As a result, two independently activated switching contacts are always present for each active conductor L1, L2 and L3.

If all control coils SP1, SP2, SP3 are activated and, for example, the first switching contact $K_{1a}$ of the first relay R1 is welded, then galvanic isolation will still be present since contact $K_{2b}$ causes isolation as a result of the serial connection. Even if the switching contact $K_{1a}$ is not opened due to a welded connection of contact $K_{1a}$, the opened switching contact $K_{2b}$ provides the necessary isolation.

Other ways of routing the connection of active conductors L1, L2, L3 to the corresponding terminals $L1_{WR}$, $L2_{WR}$, $L3_{WR}$ of the inverter 1 are possible. However, routing over two switching contacts of the same relay is not preferred, since such arrangements may not be standard-compliant. As a result, each inverter terminal may be disconnected from the corresponding active conductor, even if any single one of the relays R1, R2, R3 fails. Even in the rare case that any two of the relays R1, R2, R3 fail, only one inverter terminal may remain connected to the corresponding active conductor, while the other two terminals are disconnected.

As shown in FIG. 3, each of the relay coils SP1, SP2, SP3 is connected to the output of a corresponding AND gate G1, G2, G3 via relay drivers RT. One of the inputs of the AND gates G1, G2, G3 is connected to a control unit BFS for relays R1, R2, R3 via a cable that carries the setting signals S1, S2, S3. The other input of the AND gates G1, G2, G3 may be activated via a safety signal SB from a watchdog configuration W. The watchdog configuration W is connected to the control unit BFS via cable 5, which may send a test signal between both units. The relay drivers RT are also connected to the control unit BFS via cable 6, which may send a relay test signal RTS.

At the relay drivers RT, the relay control signals for the control coils SP1, SP2, SP3 may be interrupted by a test signal RTS only briefly to prevent any contact separation. During this time, a response of the control coils SP1, SP2, SP3 to the test signal RTS is evaluated by the control unit BFS. This allows the relay drivers RT and the control coils SP1, SP2, SP3 to be checked without the need to disconnect the inverter 1 and its full bridge circuit 2 from the grid NE.

The measurement of voltages $V_{R1}$, $V_{R2}$, $V_{R3}$ and $V_{L1}$, $V_{L2}$, $V_{L3}$ is used to additionally check the functionality of the relay arrangement 4.

A possible monitoring scheme for the relay arrangement 4 may include the following tests. If the control unit BFS fails, the watchdog configuration W will suppress the closing of relays R1, R2, R3. If the watchdog configuration W fails, the control unit BFS will suppress the closing of relays R1, R2, R3. If one of the AND gates G1, G2, G3 fails, the control unit BFS detects this failure via the test signal RTS of relays R1, R2, R3. This also applies when one or more of the relay drivers RT fails.

Because of the chosen wiring, even in the event of a single error, all grid phases will be reliably disconnected from the inverter 1.

The invention is not limited to the example given here. For example, a half-bridge may be used instead of a full bridge, or a different capacitor—filter arrangement $C_1$, $C_2$, $C_3$, $L_N$ may be selected. The inverter 1 may not include a step-up converter 3.

The relay arrangement 4 may alternatively be integrated in a separate housing, instead of being integrated in the inverter housing. It is also contemplated to use a single inverter arrangement for disconnection of a group of inverters from a common grid. The inverters in this case may be comprised in a single power generation system, or be part of multiple power generation systems. An anti-islanding functionality may in this case be provided for the group of inverters or power generation systems by the joint relay arrangement.

The term "relay" used herein refers to any device that is capable of connecting and disconnecting an electrical connection in response to a control signal, and is not meant to be limited to mechanical relays activated by magnetic force from a coil as used within the above description.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What we claim is:

1. A power generation system for feeding electrical power from a generation unit into a three-phase grid via three AC terminals, the system comprising:
    a relay arrangement for disconnecting the system from the grid, wherein:
    the relay arrangement comprises at least three relays,
    each of the three relays comprises a control coil and two switching contacts operated by the corresponding control coil, and
    each of the AC terminals is connectable to the grid via a first switching contact and a second switching contact, wherein each of the first switching contact and the second switching contact is within a different one of the relays.

2. The system of claim 1, wherein the system further comprises an inverter configured to receive the electrical power from the generation unit and convert a DC power into an AC power.

3. The system of claim 2, wherein the inverter is a photovoltaic inverter.

4. The system of claim 3, wherein the generation unit comprises photovoltaic generators.

5. The system of claim 2, wherein the inverter is a transformerless inverter.

6. The system of claim 1, wherein each of the relays is separately operable by a corresponding relay driver.

7. The system of claim 6, wherein each relay driver is configured to operate the corresponding relay only upon presence of a setting signal of a control unit and an interrupt signal of a watchdog arrangement.

8. The system of claim 7, wherein the control unit is monitored by the watchdog arrangement.

9. The system of claim 7, wherein each relay driver is configured to be monitored by a test signal of the control unit.

10. The system of claim 9, wherein control signals for the control coils are interrupted upon presence of the test signal, a duration of the interruption is selected to be short enough to prevent an opening of switches for disconnecting the system from the grid, and a response of the control coils to the test signal is evaluated by the control unit.

11. The system of claim 1, wherein the relay arrangement comprises automatic switches for preventing unintended connection of the system to the grid.

12. The system of claim 1, wherein the relay arrangement is integrated into a housing of the system.

13. The system of claim 1, wherein the relays are arranged on a circuit board.

14. An inverter for converting a DC power into an AC power provided to a three-phase grid via three AC terminals, the inverter comprising:
    a relay arrangement for disconnecting the inverter from the grid, wherein:
    the relay arrangement comprises at least three relays,
    each of the three relays comprises a control coil and two switching contacts operated by the corresponding control coil, and
    each of the AC terminals is connectable to the grid via a first switching contact and a second switching contact, wherein each of the first switching contact and the second switching contact is within a different one of the relays.

15. The inverter of claim 14, wherein the inverter is a photovoltaic inverter.

16. The inverter of claim 14, wherein the relay arrangement is integrated into a housing of the inverter.

17. A relay arrangement for disconnecting an inverter from a three-phase grid with three active conductors, the relay arrangement comprising:
    at least three relays, wherein:
    each of the three relays comprises a control coil and two switching contacts operated by the corresponding control coil, and
    each switching contact is connected to another switching contact that is within a different one of the relays.

18. The relay arrangement of claim 17, wherein the relay arrangement further comprises automatic switches for preventing unintended connection of the inverter to the grid.

19. The relay arrangement of claim 17, wherein each of the relays is separately operable by a corresponding relay driver.

20. The relay arrangement of claim 19, wherein each relay driver is configured to operate the corresponding relay only upon presence of a setting signal of a control unit and an interrupt signal of a watchdog arrangement.

21. The relay arrangement of claim 20, wherein the control unit is monitored by the watchdog arrangement.

22. The relay arrangement of claim 20, wherein each relay driver is configured to be monitored by a test signal of the control unit.

23. The relay arrangement of claim 22, wherein control signals for the control coils are interrupted upon presence of the test signal, a duration of the interruption is selected to be short enough to prevent an opening of switches for disconnecting the inverter from the grid, and a response of the control coils to the test signal is evaluated by the control unit.

* * * * *